United States Patent [19]

Wenda et al.

[11] E Re. 30,674

[45] Reissued Jul. 14, 1981

[54] METHOD AND APPARATUS FOR FEEDING A GLASS MELTING FURNACE

[75] Inventors: Alojzy Wenda; Leonard E. Olds, both of Arvada, Colo.

[73] Assignee: Johns-Manville Corporation, Denver, Colo.

[21] Appl. No.: 125,609

[22] Filed: Feb. 28, 1980

Related U.S. Patent Documents

Reissue of:

[64] Patent No.: 4,142,880
Issued: Mar. 6, 1979
Appl. No.: 865,644
Filed: Dec. 29, 1977

[51] Int. Cl.[3] ..... C03B 3/00

[52] U.S. Cl. ..... 65/29; 65/134; 65/164; 65/335; 414/147

[58] Field of Search ..... 65/29, 134, 335, 164; 414/147

[56] References Cited

U.S. PATENT DOCUMENTS

| | | | |
|---|---|---|---|
| 1,992,994 | 3/1935 | Delpech . | |
| 2,910,195 | 10/1959 | Olson . | |
| 3,244,494 | 4/1966 | Apple et al. | 65/335 X |
| 3,877,915 | 4/1975 | Hohman | 65/135 |
| 3,929,445 | 12/1975 | Zippe | 65/335 |
| 3,964,892 | 6/1976 | Schumacher et al. | 65/335 X |
| 3,980,460 | 9/1976 | Nelson et al. | 65/335 X |

FOREIGN PATENT DOCUMENTS

| | | |
|---|---|---|
| 539769 | 9/1941 | United Kingdom . |
| 843078 | 8/1960 | United Kingdom . |

*Primary Examiner*—Arthur D. Kellogg
*Attorney, Agent, or Firm*—Robert M. Krone; Joseph J. Kelly

[57] ABSTRACT

A batch material feeder for an electrically heated open-top refractory furnace, particularly a circular furnace, wherein the feeder includes a trough holding batch material and mounted over the furnace top, there being a rotatable agitator within the trough for moving batch material over discharge openings in the trough bottom, so as to deposit the batch material over the top of the molten mass in a manner that provides for a thin uniform layer of batch while assuring proper control of the thickness of the deposited layer.

10 Claims, 5 Drawing Figures

Fig. 1.
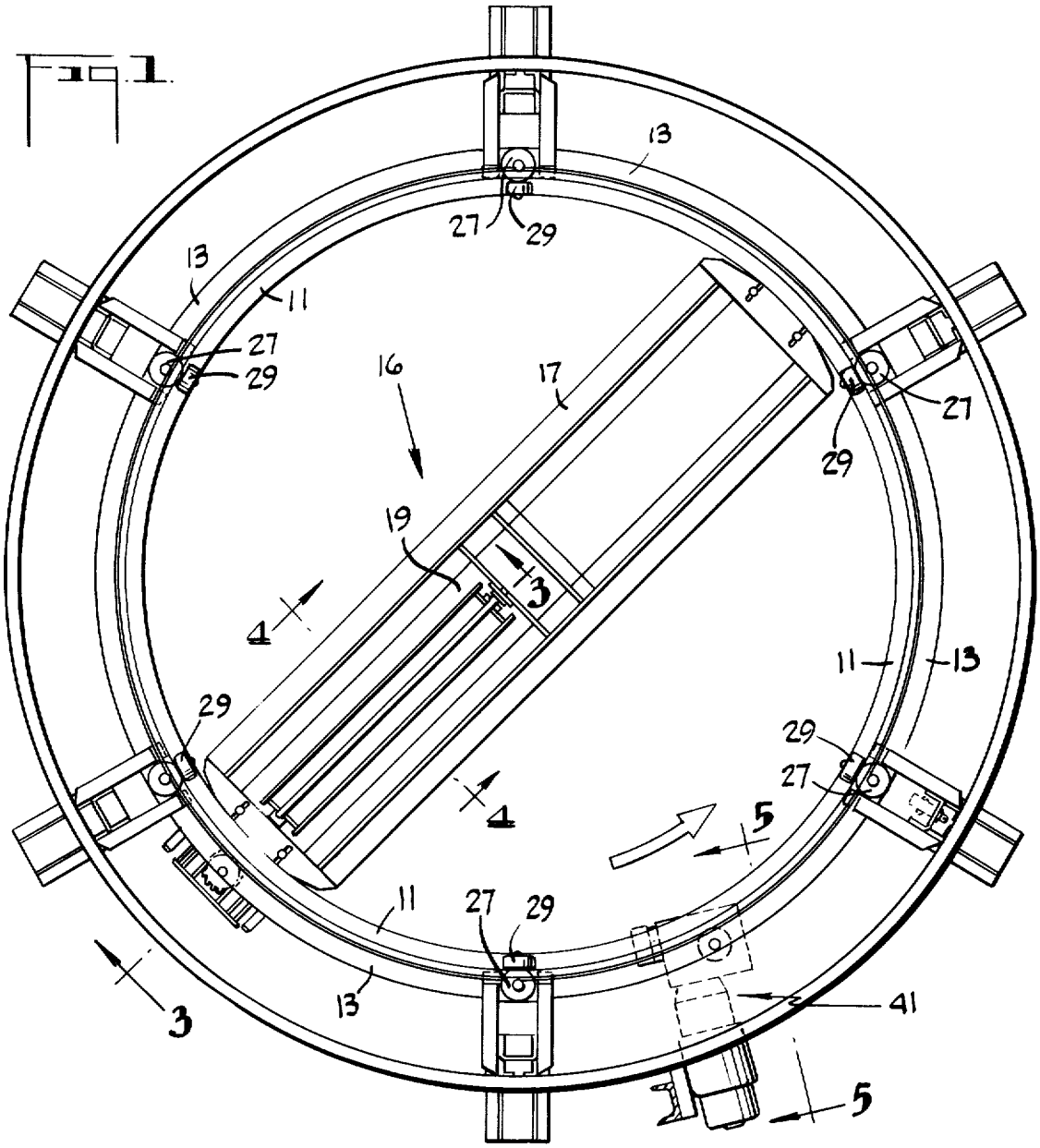
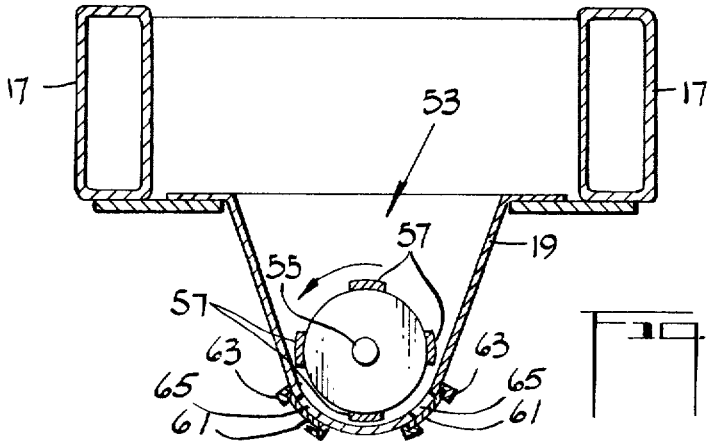
Fig. 4.

METHOD AND APPARATUS FOR FEEDING A GLASS MELTING FURNACE

Matter enclosed in heavy brackets [ ] appears in the original patent but forms no part of this reissue specification; matter printed in italics indicates the additions made by reissue.

BACKGROUND OF THE INVENTION

The present invention relates to a method and apparatus for distributing a controlled thin layer of particulate batch material over the top surface of a mass of molten, heat softenable material such as glass, such as in a circular electrically heated, open-top furnace and in a furnace for refractory materials in particular.

In the operation of an open-top electrically heated furnace, heat softenable batch materials such as glass forming oxides are continually fed onto the upper surface of the melt to replenish the melt in compensation for the refined molten material that is continuously withdrawn from the furnace through a centrally located outlet. These batch materials when spread in a layer over the upper melt surface also serve as a partially insulating blanket to minimize the heat loss to the ambient through the top of the melt. Problems arise when an even layer of batch of a certain minimal thickness is not maintained over the whole upper surface of the melt. Regions of the batch layer that are too thin "melt out," exposing the molten material and creating regions of excessive heat loss, which occurrence tends to lower melt temperatures thereby lowering melt flow rates. In addition, regions of uncovered melt may cause equipment located over the furnace, such as a batch feeder, to be exposed to excessive heat. When too thick a layer is deposited melt temperature will rise, increasing melt flow rate. Too much batch also promotes formation of a surface crust when hinders the passage of overlaying batch therethrough.

Inability to maintain a uniform thin layer of batch at an optimal thickness contributes to undesirable hot and cold thermal cycling of the melt and a resulting undesirable fluctuating of furnace performance. These ill effects are aggravated as the operating temperature of a furnace is increased; thus in refractory furnaces which typically operate at 3400° F.–4000° F. the need is greatest for the controlled deposit of batch.

One known method of feeding batch material to a circular, open-top furnace includes a distribution pan mounted to move over the melt surface in a circular path to sweep from the inner to the outer regions of the melt surface in an oscillating manner. Batch is fed to the pan which in turn deposits the batch across the melt surface. The pan does not evenly deposit the batch and the operation must be supplemented with manual distribution by an operator using a wooden hoe in an attempt to form a uniform thin layer of batch of desired thickness. The batch feeders disclosed in U.S. Pat. No. 3,980,460 are designed for lateral distribution of batch material over the length of furnace chambers of a square or rectangular form. Such methods and equipment do not deposit a thin uniform layer of batch.

It is an object of the invention to provide in an open-top electric furnace, a batch feeder for depositing batch materials onto the entire melt surface in a uniform thin layer and to continually supplement that layer in a controlled manner that ensures that an optimal thickness will be maintained.

Another object of the invention is to feed batch material to an open-top electrical furnace in a manner that effectively and efficiently reduces heat loss through the upper surface of the melt.

SUMMARY OF THE INVENTION

Accordingly, the present invention provides in a circular open-top electric furnace a method for feeding batch material to the upper surface of the melt that includes: quickly loading a perforated bottomed trough with a charge of batch such that the batch does not pass through the perforations; moving the trough as a radial arm about the furnace center while agitating the charge of batch material in the vicinity of the perforations so as to discharge batch through the perforations and onto the entire upper surface of the melt in a thin layer, agitation occurring only during rotation of the trough; automatically stopping the motion of the trough after a predetermined number of revolutions and when a desired thickness of batch layer is deposited; sensing the level of the charge of batch within the trough and in response to a depletion, automatically reloading the trough with batch; and sensing the thinning of the batch layer to a thickness less than a certain minimal and in reponse thereto automatically restarting the depositing action of the trough.

The invention also includes apparatus for depositing particulate material over a circular area such as the upper surface of a molten mass carried in a circular, open-top furnace, which includes a trough-like hopper for holding particulate material and carried by a carriage which is mounted for rotation in a horizontal plane such that the hopper traverses the circular area in the fashion of a radial arm about the center of the area, the bottom of the hopper having discharge openings that extend generally radially. The apparatus also includes means for supporting the carriage and means for rotating the carriage. An agitator is located within the hopper in the vicinity of the openings, for engaging and stirring material within the hopper and facilitating its flow through the hopper openings. The agitator is connected through a gear drive train with traction means carried by the carriage support, such as a ring gear, for driving the agitator whenever the carriage is in motion.

The invention also entails means, such as a heat sensor, for detecting the thickness of a layer of batch material on the upper surface of a melt, and means, responsive to the thickness sensor, for controlling the revolving of the hopper carriage. In the preferred embodiment of the invention, after the hopper has revolved a predetermined number of times it is stopped at a loading station where there is located means for sensing when the hopper is almost depleted of its charge. The loading station includes apparatus for discharging into the hopper a predetermined amount of material which is conveyed thereto from a supply bin by pneumatic means.

BRIEF DESCRIPTION OF THE DRAWINGS

FIG. 1 is a schematic plan view of the batch feeder according to the invention;

FIG. 4 is an enlarged view in cross-section taken along the line 4—4 of FIG. 1.

DETAILED DESCRIPTION OF THE DRAWINGS

Figure 2:
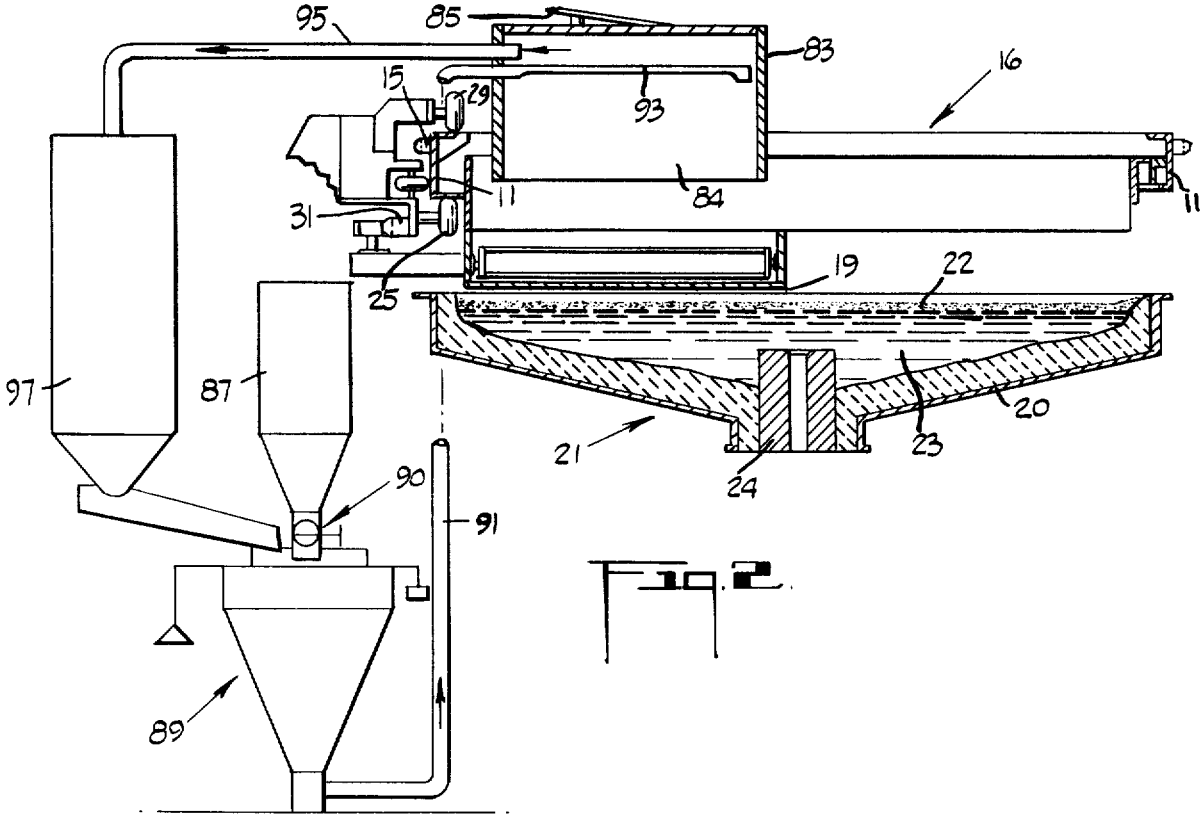
FIG. 2 is a fragmentary view in partial cross-section of the furnace and batch feeder and including batch storage and supply apparatus.

Referring to FIG. 2, an overall melting furnace for refractory material is indicated at 21 and includes a furnace shell 20 from which molten refractory is discharged through an outlet member 24. Primary electrodes, not shown, are positioned radially about the outlet member 24, and the refractory material is melted by the heating effect of current flowing between the primary electrodes and the outlet member 24 to form a pool of molten material 23. A batch layer 22, established on the surface of the molten mass 23 replenishes the pool of molten material 23 as molten material is discharged from the furnace through outlet 24 and also acts as an insulating blanket thereon to ensure efficient operation of the furnace 21.

Figure 3:
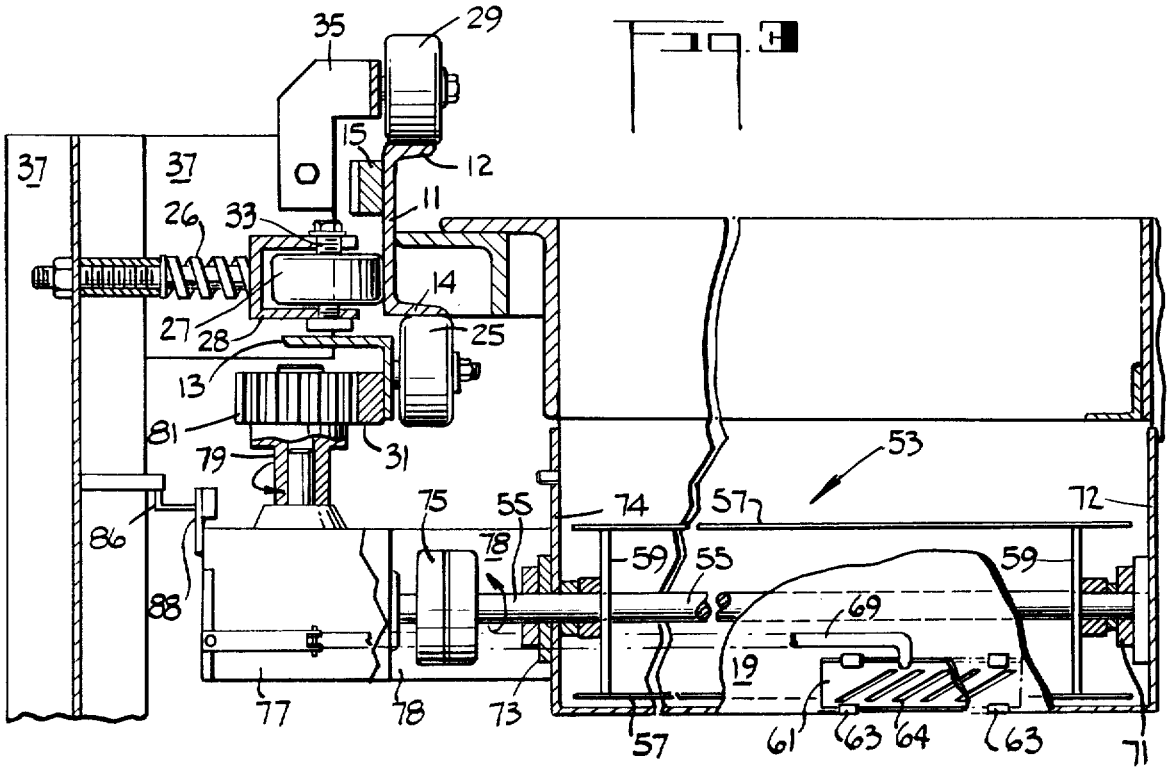
FIG. 3 is an enlarged view in partial cross-section taken along the line 3—3 of FIG. 1.

A batch feeder 16, embodying the invention, and shown in FIGS. 1 and 2, includes a support ring 11 which is centered over the furnace chamber 20 and mounted to rotate in a horizontal plane about its center. As shown in FIG. 3, support ring 11 has upper and lower flange portions 12 and 14, respectively. The weight of support ring 11 and of the feeder equipment attached thereto, which will be described hereinafter, is supported by a series of free-wheeling steel rollers 25 upon which rides the lower surface of ring flange 14. The rollers 25 are suitably mounted at equally spaced points along a stationary support ring 13 which is supported at six equally spaced points along its circumference by a fixedly mounted support frame 37. Also carried at six points along frame 37 are free-wheeling steel rollers 27 mounted on vertical shafts 33 in clevis 28. The rollers 27 ride against an outer surface of support ring 11 so as to maintain the rotational axis of the ring 11 about the center of the furnace. The clevis are mounted through springs 26 to allow roller positions to adjust to allow for thermal expansion and contraction of support ring 11. Attached to the support frame 37 by way of support arms 35, are free-rotating upper rollers 29 which engage the upper surface of flange 12 of the support ring 11 to steady the rotation of ring 11 in a wobble-free path.

Figure 5:
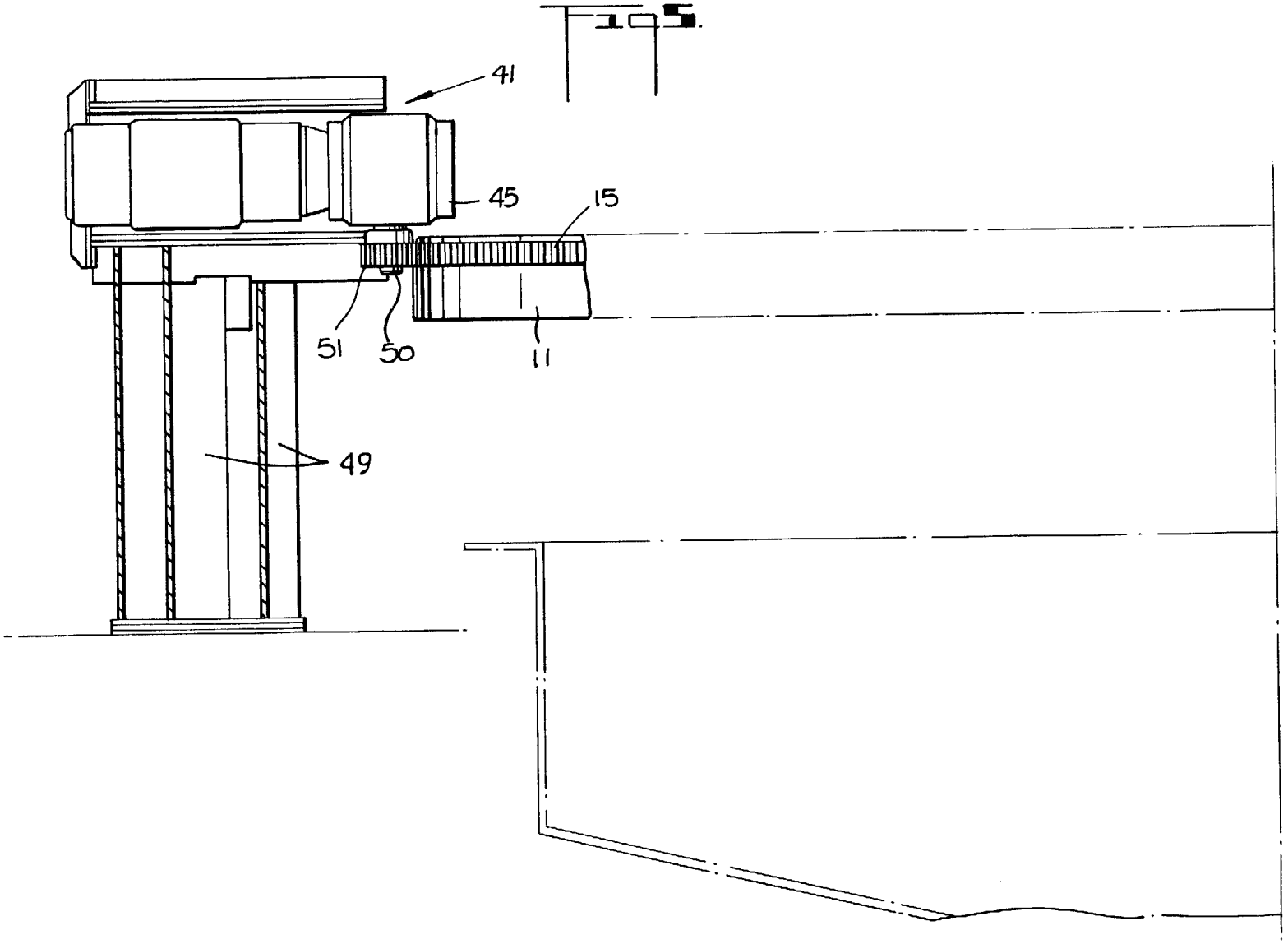
FIG. 5 is an enlarged view in partial cross-section taken along the line 5—5 of FIG. 1.

A circumferentially extending driven gear ring 15, as best shown in FIG. 5, is affixed to the outer surface of the vertical web portion of the support ring 11. The primary drive unit 41 includes an electric motor 43 which is secured to a firmly anchored support stand 49. A right angle drive and gear reducer 45, connected to the motor 43 has a downwardly extending output shaft 50 to which is attached drive spur gear 51. Drive ring gear 15 and spur gear 51 mesh in a drive relationship.

As FIGS. 1 and 4 show, the batch feeder 16 further includes a trough support frame 17 that extends diametrally between attachment points on the inner periphery of support ring 11. A batch trough 19 mounted between support members of the support frame 17 as shown in FIG. 4, extends radially above the melt 23 for a distance substantially the radius of the upper surface of melt 23. Mounted within the trough 19 is batch agitator 53 which comprises four longitudinally extending paddles 57 attached symetrically about disk-like supports 59 attached to radially extending drive shaft 55 which, as seen in FIG. 3, is rotatably mounted in bearings 71 carried on the innermost trough wall 72, and through bearings 73 carried on the outermost trough wall 74. The radially outward end of shaft 55 is joined by means of a coupling 75 with the output shaft of a right angle drive 77 which is fixedly mounted to the trough wall 74 by way of support members 78. A shaft 79 extends vertically upwardly from the right angle drive 77 and has a driven spur gear 81 affixed thereto. The stationarily mounted gear ring 31 which is attached to the support ring 13, engages the spur gear 81.

As may best be seen in FIGS. 3 and 4, there are a series of slots 65, each slot having a diagonal configuration (as viewed in FIG. 3), which series of slots extends longitudinally across the lower right and left portions, as viewed in FIG. 4, of trough 19. The discharge slots 65 are grouped into four longitudinally extending discharge zones. Adjacent each zone of slots 65 is a baffle plate 61 mounted in guide brackets 63 flush with and slidably engaging the exterior surface of trough 19. The baffle plates have slots 64 which match in size and configuration the corresponding trough discharge slots 65. An adjust knob 69, attached to each baffle plate has an end (not shown) which is adjustably mounted for adjusting the baffle plate 61 back and forth such that the effective size of discharge openings is greatest when slots in baffle and trough fully align with each other. Further adjusting of the baffle plate from this position progressively narrows the effective size of the discharge openings. The maximum size for each of the trough openings is that size which, it has been discovered for a batch material of a given consistency, does not permit unassisted out-flow of material. In the preferred embodiments, these openings are for handling a typical alumina and silica refractory batch and take the form of slots measuring approximately $\frac{1}{2}'' \times 3\frac{1}{2}''$.

Although in the preferred embodiment of the invention, the agitator 53 is driven in direct rotation, eccentric drive means (not shown) may be installed between the right angle drive 77 and the agitator shaft 55 so that shaft 55 may be driven rotationally back and forth in an oscillating fashion.

Shown in FIG. 2 is a batch dispersion box 83, held in position above the batch feeder 16 by a support arm 85. Box 83 has four sides and a top with an open bottom 84 being disposed such that the batch feeder 16 may be rotated into a loading position where the open top of trough 19 is directly below dispersion box 83 and aligned with box opening 84. A mechanically activated limit switch 86, shown in FIG. 3, is affixed to a portion of the support frame 37 which is below and radially in line with dispersion box 83. A limit switch actuator 88 depends upwardly from the right angle drive 77 so as to engage the limit switch 86 when trough 19 has been revolved to the above-described loading position. There is a non-contact, level sensor, not shown, that is preferably located along the length of the dispersion box 83, and which is responsive to the level of batch within the trough 19.

A hopper 87, holding a reservoir of batch material, is located above a metering unit 89 to which it delivers batch material by way of valve 90. Valve 90 will automatically deliver a quantity of batch material to the holding chamber of the metering unit 89 equal to an amount sufficient for filling the distribution trough 19. On predetermined signal, a high pressure air blast, periodically delivered to the airtight chamber of the metering unit 89 will propel its charge of batch material through a conduit 91 as a plug of material in the manner known as dense phase conveying. Conduit 91 connects with the interior of the dispersion box 83 through a discharge pipe 93 which directs material downwardly toward trough 19. Any excess dust is returned by conduit 95 to a dust collector 97 which in turn redelivers collected material to the metering unit.

In the operation of preferred embodiment of the invention, the support ring 11 and the apparatus it carries is driven by drive assembly 41 to revolve at a steady rate, typically 3–5 rpm. The limit switch actuator 88 will, once on each revolution of the feeder assembly 16, engage the switch 86 which signals the stopping of rotation of the feeder assembly 16 in a position where the trough 19 is held directly below the open bottom 84 of the dispersion box 83 (within plus or minus 2″). The trough batch level sensor, such as WESMAR sonic sensor, will then detect whether the level of batch in the trough 19 is below some predetermined level, upon which occasion the batch metering unit 89 is signaled to deliver its charge of batch by way of dispersion box 83 to the trough 19. This delivery of batch is accomplished in a very short time, typically 3 to 5 seconds. By virtue of the fact that batch material will not flow through the open discharge slots 65 whenever the trough 19 is stationary, there is no undesirable depositing of batch during this loading operation.

Three temperature sensors (not shown) such as the IRCON MODLINE UNIT, are responsive to the thickness of the batch layer 22 falling below a specified minimum level, by determining when a specified maximum temperature is exceeded within 30×40 inch areas between each primary electrode. If the maximum temperature is exceeded a signal starts the motion of the batch feeder 16 after a three to four second delay for recharging. When the temperature sensors indicate that the batch layer 22 is sufficient, the trough 19 will remain at its loading position until the need for batch distribution is indicated. Once put in motion, the batch feeder of the invention will make one revolution of the furnace after which the trough 19 will be delayed at its loading position for 3 to 4 seconds, which time period allows for any recharging of the trough 19 if the necessity is detected; then the depositing action will be automatically resumed if the heat sensors indicate the need for continued distribution of batch material.

Because of the flow patterns taken by molten material in an electric furnace, deposited batch will melt at differing rates in those surface regions that vary in their radial position from the center of the melt. In the preferred embodiment of the invention, the groupings of discharge slots 65 into four regions longitudinally across the trough bottom, and the individual adjusting of discharge slot size within these regions, provide for feed rates that vary over four annular zones of the melt surface in order to accommodate the differing feed requirements of these zones. Thus, melt and feed rates are substantially balanced over the entire upper surface of the melt and at a pre-determined rotational speed of feeder assembly 16 and agitator 53 the depositing of the desired uniform, very thin layer over the entire melt surface is achieved. Using the apparatus of the preferred embodiment, a fine batch layer typically ranging in thickness from 0.008″ to 0.13″ may be uniformly deposited over the melt of a refractory furnace.

Various modifications of the above described embodiments of the invention will be apparent to those skilled in the art, and it is understood that such modifications can be made without departing from the scope of the invention if they are within the spirit and tenor of the accompanying claims.

What is claimed is:

1. Apparatus for depositing particulate batch material over substantially the entire top surface of molten material in a furnace, comprising;

(a) a carriage; means for supporting said carriage for movement in a generally horizontal plane over said surface;

(b) means for driving said carriage;

(c) a trough-like hopper carried by said carriage for holding said particulate material, the bottom of said hopper having material discharge openings;

(d) an agitator mounted within said hopper for engaging said particulate material in the vicinity of said openings;

(e) means for driving said agitator whenever said carriage is driven to effect the flow of said particulate material through said openings;

(f) means responsive to the thickness of said deposited material, for controlling the movement of said carriage; and (g) means responsive to the depletion of said particulate material in said hopper for controlling the supplying of said hopper with particulate material.

2. Apparatus according to claim 1 wherein said agitator comprises a longitudinally extending shaft rotatably mounted within said hopper, said shaft carrying a plurality of longitudinally extending paddles spaced from, and parallel to, said shaft and wherein said agitator driving means includes gearing connected to said shaft and engaging stationary traction means on said carriage support means.

[3. Apparatus for despositing particulate batch material over substantially the entire circular top surface of molten material in a circular furnace, comprising:

(a) a carriage mounted for rotation in a generally horizontal plane over said circular surface about the center of said surface;

(b) means for supporting said carriage;

(c) means for rotating said carriage;

(d) a trough-like hopper carried by said carriage for holding said particulate material, the bottom of said hopper having material discharge openings;

(e) an agitator mounted within said hopper for engaging said particulate material in the vicinity of said openings; and (f) means for driving said agitator whenever said carriage is rotated to effect the flow of said particulate material through said openings.]

[4. Apparatus according to claim 3 wherein said discharge openings are provided in the bottom of said hopper for a radial extent substantially equal to the radius of the surface of said molten material.]

5. Apparatus [according to claim 3 including] *for depositing particulate batch material over substantially the entire circular top surface of molten material in a circular furnace, comprising:*

*(a) a carriage mounted for rotation in a generally horizontal plane over said circular surface about the center of said surface;*

*(b) means for supporting said carriage;*

*(c) means for rotating said carriage;*

*(d) a trough-like hopper carried by said carriage for holding said particulate material, the bottom of said hopper having material discharge openings, said discharge openings being provided in the bottom of said*

*hopper for a radial extent substantially equal to the radius of the surface of said molten material;*

*(e) an agitator mounted within said hopper for engaging said particulate material in the vicinity of said openings;*

*(f) means for driving said agitator whenever said carriage is rotated to effect the flow of said particulate material through said openings; and*

*(g)* means responsive to the thickness of said layer of material, for controlling the [rotating] *rotation* of said carriage.

6. Apparatus according to claim [3] *5* wherein said agitator comprises a longitudinally extending shaft rotatably mounted within said hopper, said shaft carrying a plurality of longitudinally extending paddles spaced from, and parallel to, said shaft and wherein said agitator driving means includes gearing connected to said shaft and cooperating with a circumferentially extending stationary gear on said carriage support means.

7. Apparatus according to claim 6 wherein said agitator shaft gearing drives said agitator rotatably about its axis.

8. Appartus according to claim 6 wherein said agitator shaft gearings drives said agitator in an oscillating manner about its axis.

9. Apparatus according to claim [3] *5* wherein there are radially extending groups of said discharge openings, each group of openings being adjustable as to opening size.

10. An apparatus according to claim [3] *5* wherein said carriage includes a circular vertically extending surface and a circular horizontally extending surface, said carriage support means having a first plurality of rollers on radially extending axes for engaging said first horizontal carriage surface for supporting said carriage and a second plurality of rollers on vertical axes mounted on said carriage support means, for engaging said vertically extending circular surface for holding steady the axis of rotation of said carriage.

11. A method for continually depositing a thin, uniformly thick layer of batch material over substantially the entire top surface of molten material in a furnace comprising:

(a) quickly loading a perforated-bottomed trough with a charge of batch material, such that the batch does not pass through the perforations;

(b) moving the trough in a generally horizontal plane above the molten material while agitating the charge of batch material in the vicinity of the perforations so as to discharge batch through the perforations and onto the upper surface of the molten material in a thin layer, said agitation occurring only during moving of the trough;

(c) stopping motion of the trough after a pre-determined distance of travel and when a desired thickness of batch material is deposited;

(d) sensing the depletion of the charge of batch within the trough and in response thereto automatically recharging the trough; and (e) sensing the thinning of the batch layer to a thickness less than a certain minimal and in response thereto automatically restarting the depositing motion of the trough.

12. A method for continually depositing a thin, uniformly thick layer of batch material over substantially the entire top surface of molten material in a circular furnace comprising:

(a) quickly loading a perforated-bottomed trough with a charge of batch material, such that the batch does not pass through the perforations;

(b) moving the trough as a radial arm about the furnace center while agitating the charge of batch material in the vicinity of the perforations so as to discharge batch through the perforations and onto the upper surface of the molten material in a thin layer, said agitation occurring only during rotation of the trough;

(c) stopping motion of the trough after a pre-determined number of revolutions and when a desired thickness of batch material is deposited;

(d) sensing the depletion of the charge of batch within the trough and in response thereto automatically recharging the trough; and, (e) sensing the thinning of the batch layer to a thickness less than a certain minimal and in response thereto automatically restarting the depositing motion of the trough.

* * * * *